United States Patent
Rabinovich et al.

(10) Patent No.: US 12,184,407 B2
(45) Date of Patent: Dec. 31, 2024

(54) SECURED CLOCK SYNCHRONIZATION IN A PACKET-COMPATIBLE NETWORK

(71) Applicant: ADVA Optical Networking SE, Martinsried/Munich (DE)

(72) Inventors: Michael Rabinovich, Modiin (IL); Andrew Sergeev, Kfar Saba (IL); Joo Yeon Cho, Wolfratshausen (DE); Shihuan Zou, Munich (DE)

(73) Assignee: ADTRAN Networks SE, Meiningen (DE)

( * ) Notice: Subject to any disclaimer, the term of this patent is extended or adjusted under 35 U.S.C. 154(b) by 234 days.

(21) Appl. No.: 17/991,356

(22) Filed: Nov. 21, 2022

(65) Prior Publication Data

US 2023/0171015 A1    Jun. 1, 2023

(30) Foreign Application Priority Data

Nov. 23, 2021    (EP) .................................... 21210032

(51) Int. Cl.
*H04J 3/06*    (2006.01)
(52) U.S. Cl.
CPC .......... *H04J 3/0667* (2013.01); *H04J 3/0644* (2013.01)
(58) Field of Classification Search
CPC .............................. H04J 3/0667; H04J 3/0644
See application file for complete search history.

(56) References Cited

U.S. PATENT DOCUMENTS

| 8,064,485 | B1 | 11/2011 | Montini et al. | |
| 9,106,352 | B2 * | 8/2015 | Zheng | H04J 3/0658 |
| 9,106,353 | B2 * | 8/2015 | Hsueh | H04L 63/0428 |
| 9,614,819 | B2 * | 4/2017 | Mizrahi | H04J 3/0667 |
| 2009/0204811 | A1 | 9/2009 | Fries et al. | |
| 2010/0049964 | A1 | 2/2010 | Kondapalli et al. | |

(Continued)

FOREIGN PATENT DOCUMENTS

| WO | 2015049138 A1 | 4/2015 |
| WO | 2021094311 A1 | 5/2021 |

OTHER PUBLICATIONS

Shereen, Ezzeldin et al.: Next Steps in Security for Time Synchronization: Experiences from Implementing IEEE 1588 v.2.1.
European Search Report, EP 21210032, dated May 11, 2022.

*Primary Examiner* — Bailor C Hsu
(74) *Attorney, Agent, or Firm* — Whitestone Law, PLLC

(57) ABSTRACT

There is provided a technique of securing clock synchronization between master clock node (MCN) and client clock node (CCN). During a cycle of exchanging PTP messages between MCN and CCN, MCN generates an associated paired message for each PTP message generated thereby and informative of $t_1$ or $t_4$ timestamps provided by MCN and sends each paired message to a validation entity (VE) via a secured channel between MCN and VE. When PTP messages traverse transparent clock nodes (TCN) between MCN and CCN, each TCN generates a paired message for each version of PTP message updated thereby and sends each generated paired message to VE via a secured channel between respective TCN and VE. VE uses the received paired messages to provide a validation of the cycle, wherein synchronization-related task(s) (e.g. clock correction by the client clock node, etc.) are provided only subject to successful validation of the cycle by VE.

19 Claims, 10 Drawing Sheets

(56) References Cited

U.S. PATENT DOCUMENTS

| | | |
|---|---|---|
| 2015/0117471 A1 | 4/2015 | Mizrahi |
| 2019/0028988 A1* | 1/2019 | Yao et al. |
| 2020/0220636 A1* | 7/2020 | Rabinovich ............... G06F 1/04 |
| 2020/0252424 A1* | 8/2020 | Regev ................... H04J 3/0667 |
| 2020/0322075 A1* | 10/2020 | Bhandari .............. H04J 3/0688 |
| 2021/0288738 A1* | 9/2021 | Byagowi .............. H05K 7/1491 |

* cited by examiner

SECURED CLOCK SYNCHRONIZATION IN A PACKET-COMPATIBLE NETWORK

CROSS-REFERENCE TO RELATED APPLICATION

This application claims priority to European Patent Application No. 21210032.5, filed Nov. 23, 2021, which is herein incorporated by reference in its entirety.

TECHNICAL FIELD

The presently disclosed subject matter relates to the field of data communication, and, more particularly, to secured clock synchronization in a packet-compatible network.

BACKGROUND

Proper operation of a data network (e.g. a telecommunication network) requires time, frequency and/or phase synchronization between various entities therein. Synchronization can be achieved, for example, by exchanging timing information (time-transfer) across the network. One of the protocols for exchanging timing information over a packet-compatible network (e.g. Ethernet, MPLS, etc.) is the IEEE 1588 Precision Time Protocol (PTP) usable for precise clock synchronization. Another example of timing protocol is Network Time Protocol (NTP). Both protocols are in-band protocols encapsulating timestamps into data packets. While in the NTP case the network nodes receive synchronization data in a pull mode (from a server or from several peer nodes), in the PTP cases, client clock nodes (referred to hereinafter also as client clocks and/or timing-clients), receive synchronization data from a master clock node (referred to hereinafter also as a master clock and/or timing-server) in a push mode.

Unless specifically stated otherwise, the following description is provided for PTP-based synchronization.

Through exchange of packetized PTP messages, which include timestamps carried inside, PTP protocol enables synchronization between a master clock node, that has access to an accurate time source (e.g. Global Positioning System), and client clock nodes having less accurate clocks. The built-in timestamps are usable for clock synchronization and enable precise time, frequency and phase distribution between the clocks.

However, possible corruption of timestamps in PTP messages, or distribution of false time-related data by an intermediate malicious node may affect operation of client clock nodes (e.g. lead to denial of service, accuracy degradation, etc.) and the network in general.

The problems of secured clock synchronization have been recognized in the conventional art and various techniques have been developed to provide the solutions, for example:

US Patent Application No. 2009/0204811 discloses a method for transmitting synchronization messages, for example PTP messages of the IEEE 1588 standard, the PTP message being inserted into a data packet in line with the Internet Protocol, the data packet having an IP header, and the data packet having a UDP header. In this case, for the encrypted transmission on the PTP message, the data packet is addressed to a UDP port that is reserved for encrypted PTP messages, the data packet is provided with an additional S-PTP header that is provided for encryption, the PTP message is extended with a pseudo random number, and the PTP message is encrypted together with the pseudo random number.

US Patent Application No. 2010/0049964 discloses system including a medium access control (MAC) module and a precise time protocol (PTP) module. The MAC module is configured to generate an identifier for a PTP frame, generate an encrypted PTP frame by encrypting the PTP frame, and output the identifier. The PTP module is configured to receive the identifier, identify the encrypted PTP frame based on the identifier in response to the encrypted PTP frame being output from the MAC module, and timestamp the encrypted PTP frame prior to the encrypted PTP frame being transmitted.

US Patent Application No. 2015/0117471 discloses a technique of securing clock synchronization in a network. The method includes receiving a first packet through a network at a first device, wherein the first packet includes a first message generated according to a precision time protocol and a first encapsulation that encapsulates one or more fields of the first message. Further, the method includes security-verifying the first packet based on the first message and the first encapsulation, and processing the first message according to the precision time protocol after the first packet is security-verified.

WO Patent Application No. 2015/049138 discloses a technique for secure transmission of time synchronization packets by a master node in a network environment. The method includes generating, by a processor, a time packet marking of a predetermined bit size. The method further comprises encrypting, by the processor, the time packet marking using a lightweight encryption technique to generate a master signature. Further, the method comprises appending, by the processor, the master signature to an encrypted time synchronization packet generated by the master node to obtain an extended encrypted packet, where the encrypted time synchronization packet includes a transmittal timestamp for time synchronization. The method further comprises transmitting, by the master node, the extended encrypted packet to a slave node in the network environment for time synchronization.

US Patent Application No. 2019/0028988 discloses a synchronization system and communication device capable of reducing the difference between the actual transmission time of the time synchronization message and the assigned transmission time. According to presented embodiments, in generation of a secure time synchronization message in the synchronization system most of the security processes is performed in an upper layer which is an MAC layer or a higher layer, and processes including the assignment of the transmission time and assignment of authentication information for authenticating validity of the transmission time are performed in a physical layer.

WO Patent Application No. 2021/094311 discloses a technique of secure time synchronization in an industrial facility. A synchronization request of a facility component is transmitted to a registration service of a certificate management of the facility and the synchronization request is examined by the registration service, wherein the synchronization request comprises a signature of the requesting facility component. Depending on an outcome of the examination, a synchronization response is then transmitted to the requesting facility component and a system time of the facility component is matched to a system time of the registration service on the basis of the synchronization response.

The references cited above teach background information that may be applicable to the presently disclosed subject matter. Therefore the full contents of these publications are incorporated by reference herein where appropriate for appropriate teachings of additional or alternative details, features and/or technical background.

GENERAL DESCRIPTION

The inventors have recognized that there is a need of securing clock synchronization with no changes in the standard processes of time stamping and PTP message exchange. The inventors have appreciated that while timestamping in the PTP protocol requires the highest available accuracy, clock correction per se can be provided in non-real time mode with no impact on the accuracy of clock synchronization. In accordance with certain embodiments of the presently disclosed subject matter, there is proposed to introduce a securing plane separated from a timestamping plane, thereby obtaining precise time stamping whilst applying a clock correction algorithm only after successful validation of the timestamps (and other timing-related data if any) with the help of the securing plane. Likewise, successfully validated timestamps can be used for other synchronization-related tasks (e.g. master clock monitoring, client clock monitoring, clock skew estimations, etc.).

In accordance with certain aspects of the presently disclosed subject matter, there is provided a method of securing a clock synchronization between a master clock node and a client clock node in a packet-compatible network. The method comprises: during a cycle of exchanging one or more sequences of PTP messages between the master clock node and the client clock node, generating, by the master clock node, a paired message for each PTP message generated thereby and informative of accurate $t_1$ or of $t_4$ timestamps provided by the master clock; sending, by the master clock node, each paired message to a validation entity, wherein the paired messages are sent via a secured channel between the master clock node and the validation entity; using, by the validation entity, the paired messages to provide a validation of the cycle; and providing a synchronization-related task subject to successful validation of the cycle by the validation entity.

When the PTP messages are traversing one or more transparent clock nodes between the master clock node and the client clock node, each transparent clock node updating, with its residence time, correction fields in versions of at least part of PTP messages traversing therethrough, the method further comprises: during the cycle, generating by each of the one or more transparent clock nodes a paired message for each version of PTP message updated thereby and sending each generated paired message to the validation entity, wherein the paired messages are sent via a secured channel between a respective transparent clock node and the validation entity; and using, by the validation entity, the paired messages received from the one or more transparent clocks when validating the cycle.

Each of the one or more transparent clock nodes updates the received versions of PTP messages from one of the following combinations of PTP messages: SYNC and DELAY REQUEST PTP messages, SYNC and DELAY RESPONSE PTP messages, FOLLOW UP and DELAY REQUEST PTP messages and FOLLOW UP and DELAY RESPONSE PTP messages.

In accordance with further aspects and, optionally, in combination with other aspects of the presently disclosed subject matter, the client clock node provides its clock correction only subject to successful validation of the cycle by the validation entity.

In accordance with further aspects and, optionally, in combination with other aspects of the presently disclosed subject matter, the validation entity can be implemented as a part of the client clock node and operatively connected by respective secured channels with the master clock node and each of the one or more transparent clock nodes. Alternatively, the validation entity can be implemented as a centralized entity operatively connected with the master clock node, the client clock node and each of the one or more transparent clock nodes by respective secured channels.

In accordance with further aspects and, optionally, in combination with other aspects of the presently disclosed subject matter, the paired messages can be copies of respective PTP messages or can be derivatives thereof. Optionally, master clock node can generate the paired messages as copies of respective versions of PTP messages and the transparent clock nodes can generate the paired messages as derivatives of respectively updated versions, the derivatives informative of residence time of the respective transparent clock nodes.

In accordance with further aspects and, optionally, in combination with other aspects of the presently disclosed subject matter, when the cycle is constituted by multiple sequences of PTP messages at least one among the master clock node and the one or more transparent clock nodes can store the paired messages generated during the cycle and transmit them all together to the validation entity for the cycle validation.

In accordance with further aspects and, optionally, in combination with other aspects of the presently disclosed subject matter, the validation of the cycle comprises validating all accurate $t_1$ timestamps, $t_4$ timestamps and data (if any) in all respective correction fields in PTP messages received by the client clock during the cycle. The validation of the cycle can further comprise at least one of: 1) authorizing sources of SYNC PTP messages and, thereby validating $t_2$ timestamps provided by the client clock node in response to reception of the SYNC PTP messages, 2) authorizing the transparent clock nodes as sources of updated versions of PTP messages.

In accordance with further aspects and, optionally, in combination with other aspects of the presently disclosed subject matter, each paired message from the transparent clock nodes can be generated as a derivative from a respective updated version of PTP message and is informative of a residence time value used for a respective update.

In such a case, the validation of the cycle can comprise, for each sequence of PTP messages in the cycle:
  comparing an accurate t1 timestamp in a paired message received by the validation entity from the master clock node with an accurate t1 timestamp in a version of PTP message received by the client clock node;
  comparing a value in a correction field in the version of PTP message bearing the accurate t1 timestamp and received by the client clock node with a sum of residence time values from all paired messages informative of the accurate t1 timestamp and received by the validation entity from the one or more transparent clock nodes;
  comparing a t4 timestamp in a paired message received by the validation entity from the master clock node with a t4 timestamp in a version of PTP message received by the client clock node;
  comparing a value in a correction field of the version of DELAY RESPONSE message received by the client clock node with a sum of residence time values from all paired messages informative of t4 or t3 timestamps and received by the validation entity from the one or more transparent clock nodes; and considering the validation of the cycle as successful when, for each sequence of PTP messages in the cycle, all compared values are equal.

In accordance with other aspects of the presently disclosed subject matter, there is provided a client clock node configured to operate in a packet-compatible network comprising a master clock node operatively connected to the client clock node, wherein the client clock node is further configured to operate in accordance with any one of the aspects of the method above.

In accordance with other aspects of the presently disclosed subject matter, there is provided a master clock node configured to operate in a packet-compatible network comprising a client clock node operatively connected to the master clock node, wherein the master clock node is further configured to operate in accordance with any one of the aspects of the method above.

In accordance with other aspects of the presently disclosed subject matter, there is provided a validation entity configured to operate in a packet-compatible network and operatively connected to a client clock node, a master clock node and transparent clock nodes (if any) via secured communication channels, the validation entity is further configured to operate in accordance with any one of the aspects of the method above.

BRIEF DESCRIPTION OF THE DRAWINGS

In order to understand the invention and to see how it can be carried out in practice, embodiments will be described, by way of non-limiting examples, with reference to the accompanying drawings, in which.

DETAILED DESCRIPTION

In the following detailed description, numerous specific details are set forth in order to provide a thorough understanding of the invention. However, it will be understood by those skilled in the art that the presently disclosed subject matter may be practiced without these specific details. In other instances, well-known methods, procedures, components and circuits have not been described in detail so as not to obscure the presently disclosed subject matter.

Unless specifically stated otherwise, as apparent from the following discussions, it is appreciated that throughout the specification discussions utilizing terms such as "processing", "sending", "receiving", "matching", "validating", "generating", "comparing" or the like, refer to the action(s) and/or process(es) of a computer that manipulate and/or transform data into other data, said data represented as physical, such as electronic, quantities and/or said data representing the physical objects. The term "computer" should be expansively construed to cover any kind of hardware-based electronic device with data processing capabilities including, by way of non-limiting example, the clock nodes and respective parts therein disclosed in the present application.

The terms "non-transitory memory" and "non-transitory storage medium" used herein should be expansively construed to cover any volatile or non-volatile computer memory suitable to the presently disclosed subject matter.

The operations in accordance with the teachings herein may be performed by a computer specially constructed for the desired purposes or by a general-purpose computer specially configured for the desired purpose by a computer program stored in a computer readable storage medium.

Figure 1A:
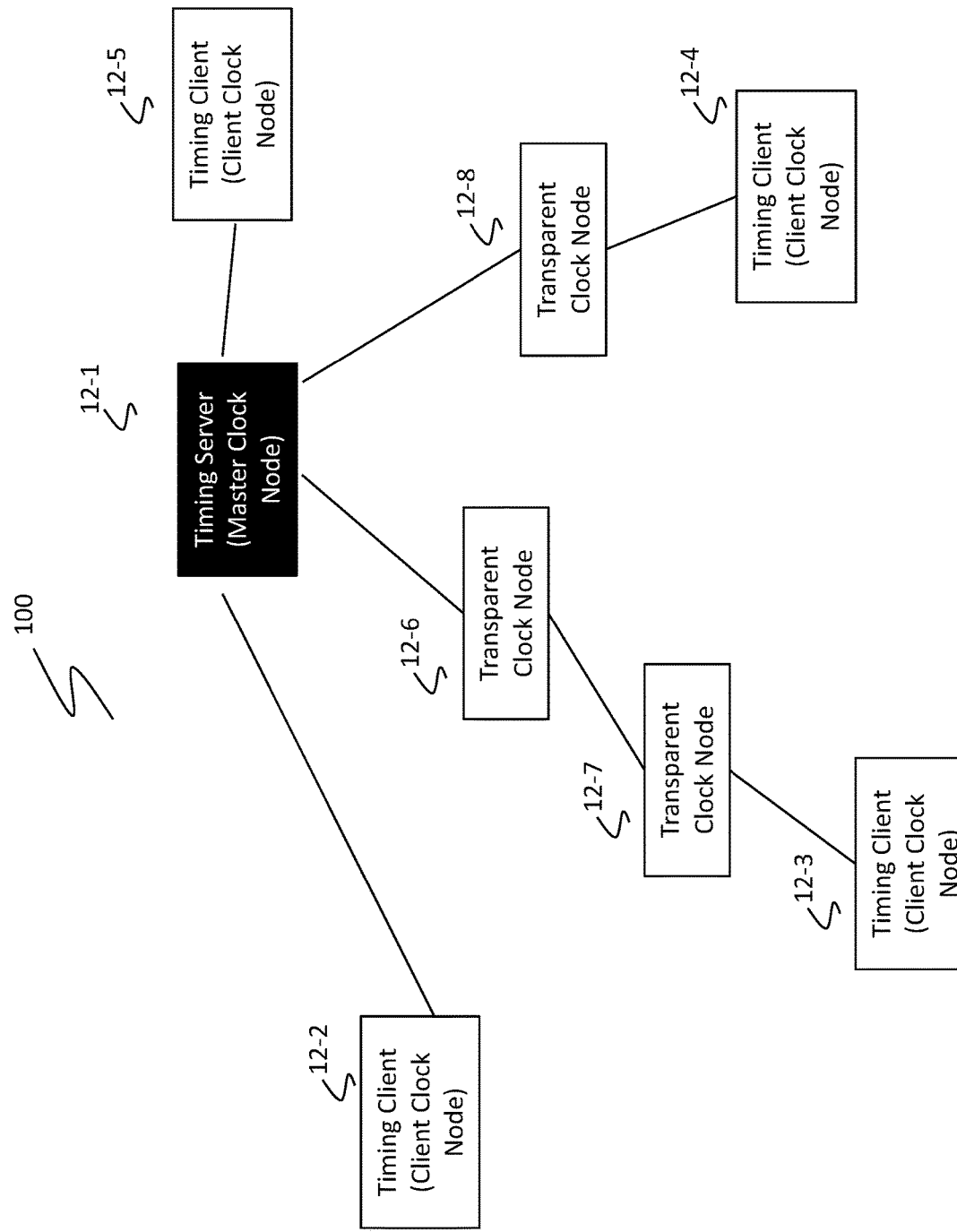
FIG. 1a illustrates a generalized schematic architecture of an exemplary time distribution network implementing the Precision Time Protocol (PTP) as known in prior art.

Bearing this in mind, attention is drawn to FIG. 1a schematically illustrating an exemplary time distribution network 100 including a plurality of clock nodes denoted as 12-1-12-8 and implementing the Precision Time Protocol (PTP) as known in prior art. Each clock node comprises a processing and memory circuitry and a clock circuitry.

The exemplary PTP-based time distribution network 100 operates on top of a packet-compatible communication network which comprises a plurality of network nodes organized in ring, bus, tree, star, or mesh topologies, or a combination of different topologies. Clock nodes are hosted by PTP-enabled network nodes of the underlying packet-compatible communication network.

In accordance with IEEE 1588 standards, time distribution in the network 100 is implemented in a hierarchical manner.

Clock node 12-1 is configured to be the source of synchronization data, i.e. to serve as PTP master clock node (referred to hereinafter also as master clock) and to provide the timing reference to the client clock nodes 12-2-12-5 (referred to hereinafter also as client clocks). Timing-clients 12-2-12-5 are operatively connected to master clock node 12-1 via the underlying packet-compatible network and configured to synchronize their clocks by exchanging PTP messages with the master clock.

At least some of the client clock nodes exchange PTP messages with the master clock node via one or more transparent clock nodes (referred to hereinafter also as transparent clocks). As illustrated, client clock node 12-3 is connected to master clock 12-1 via transparent clock nodes 12-6 and 12-7, and client clock node 12-4 is connected to master 12-1 via transparent clock node 12-8.

Typically, the transparent clocks are implemented on switches, bridges or routers of the underlying packet-compatible network. A transparent clock node does not act as a master or client clock, but, instead, forwards PTP synchronization messages and provides therein corrections corresponding to the time that the packet spends traversing through the respective network node (the residence time). The transparent clock node measures the residence time and adds the residence time into the correction field of the PTP message thereby updating PTP message traversing therethrough. The client clock accounts for the packet delay by using both the timestamp of when it started and the information in the correction field. Thus, transparent clocks improve accuracy of synchronization between the master and client clocks.

Figure 1B:
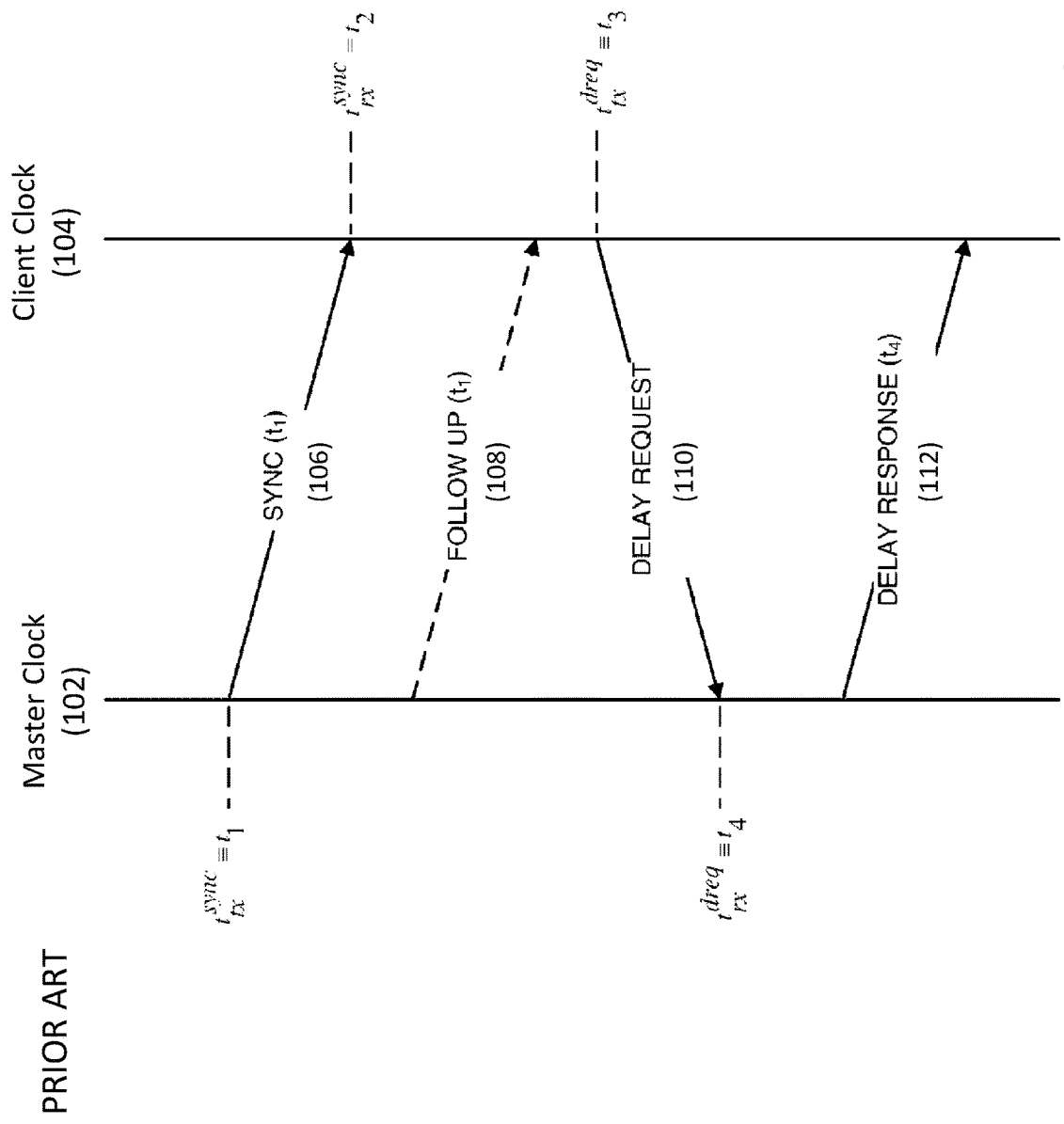
FIG. 1b illustrates a generalized pictogram of clock synchronization procedure in accordance with the PTP protocol as known in prior art.

Referring to FIG. 1b, there is illustrated a generalized sequence of PTP message exchange between master clock node 12-1 and one of the client nodes, as known in prior art. FIG. 1b provides a pictorial representation of SYNC, FOLLOW UP (optional), DELAY RESPONSE, and DELAY REQUEST messages and the associated timing information that are exchanged between a master clock 102 and a client clock 104 when operating the PTP protocol. The master clock sends a SYNC message 106 comprising embedded by the master clock timestamp $t_{tx}^{sync}$ (referred to hereinafter also as $t_1$), which represents the time at which the transmission of the SYNC message 106 was initiated. Client clock 104 receives SYNC message 106 and timestamps the time of reception, $t_{rx}^{sync}$ (referred to hereinafter also as $t_2$).

In some embodiments, (e.g. when the master clock hardware does not support inclusion into SYNC message 106 of an accurate timestamp $t_1$ indicative of transmission initiation time), a highly accurate hardware measurement of the timestamp $t_1$ can be conveyed not within the SYNC message itself, but within a separate SYNC FOLLOW UP message 108 (referred to hereinafter also as FOLLOW UP message). In such a case a value of $t_1$ timestamp embedded in SYNC message can differ from a value of accurate $t_1$ timestamp embedded in FOLLOW-UP message. Unless $t_1$ timestamp is specifically specified as "accurate $t_1$ timestamp", timestamps in SYNC message and in FOLLOW UP message are referred to hereinafter collectively as $t_1$ timestamps.

Further, the client clock sends to the master clock DELAY REQUEST message 110 timestamped with the client clock transmission time $t_{tx}^{dreq}$ (referred to hereinafter also as timestamp $t_3$). The master clock timestamps the reception time, $t_{rx}^{dreq}$ (referred to hereinafter also as timestamp $t_4$) of the DELAY REQUEST message 110. Master clock further generates DELAY RESPONSE message 112 embedding $t_4$ timestamp and transmits DELAY RESPONSE message 112 to the client clock. DELAY RESPONSE message 112 conveys the timing information $t_4$ to the client clock.

The values of $t_1$, $t_4$ (collectively referred to also as master timestamps) transmitted to the client clock 104 as part of PTP message exchange and values $t_2$ and $t_3$ (collectively referred to also as client timestamps) generated by the client clock 104 are stored at the client clock node 104. The client clock further uses the master and client timestamps in a clock correction algorithm, thus synchronizing its clock with the master clock.

For purpose of illustration only, the following description is provided for using the timestamps for clock correction (i.e. correction of time, frequency and/or phase of a client clock). Those skilled in the art will readily appreciate that the teachings of the presently disclosed subject matter are, likewise, applicable to other synchronization-related tasks using the timestamps (e.g. master clock monitoring, client clock monitoring, measuring of the master time error in case when client has phase reference (e.g. GNSS or perfectly locked to another Master), etc.).

SYNC and DELAY_REQUEST messages are referred to hereinafter as event PTP messages, i.e. messages that are tagged with a timestamp when data packets are reaching or leaving a port. FOLLOW-UP and DELAY RESPONSE messages are referred to hereinafter as conveying PTP messages corresponding to respective event PTP messages, i.e. messages conveying to the client clock timestamps provided for event messages. As detailed above, FOLLOW-UP message (if any) conveys to the client accurate $t_1$ timestamp for corresponding SYNC message, and DELAY RESPONSE message conveys to the client $t_4$ timestamp provided by the master clock when received the DELAY REQUEST event message.

Figure 1C:
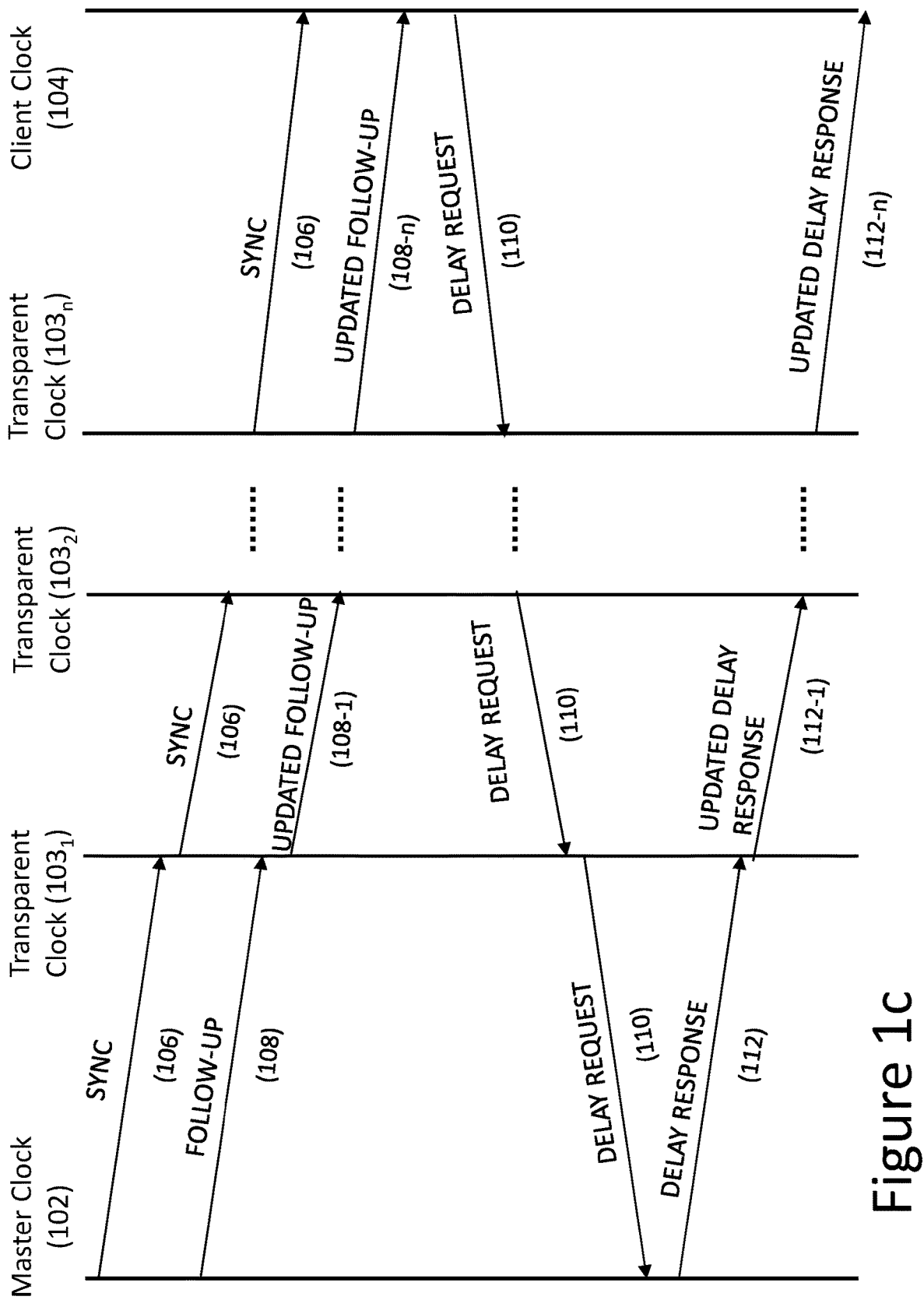
FIG. 1c illustrates a generalized pictogram of clock synchronization procedure in accordance with the PTP protocol as known in prior art, wherein the procedure involves traversing via transparent clock nodes.

Referring to FIG. 1c, there is illustrated the above sequence of PTP message exchange modified for operating via one or more transparent clocks between master clock node 12-1 and a client node.

In the illustrated embodiment, SYNC message 106 does not comprise an accurate timestamp $t_1$ embedded by the master clock and usable for clock correction. The accurate timestamp $t_1$ usable for clock correction is conveyed by FOLLOW UP message 108. When transparent clock 103$_1$ receives SYNC message 106 (referred to hereinafter also as an original version of SYNC message 106), it measures and records residence time RT1$_1$, and further forwards the SYNC message towards the client clock.

When transparent clock 103$_1$ receives FOLLOW UP message 108 (referred to hereinafter also as an original version of FOLLOW UP message 108), it updates a correction field of FOLLOW UP message 108 with the recorded residence time RT1$_1$ and forwards the updated version 108-1 of FOLLOW UP message towards the client clock. Likewise, each next transparent clock 103$_{i+1}$ receives version 108-i of FOLLOW UP message, updates the correction field of FOLLOW UP message 108 with its recorded residence time RT1$_{i+1}$ and forwards the updated version 108-(i+1) of FOLLOW UP message towards the client clock. Thus, client clock receives the last updated version 108-n of FOLLOW-UP message 108 from the last transparent clock 103$_n$ in the chain of transparent clocks between the master clock and the client clock. Version 108-n of FOLLOW-UP message bears the accurate time stamp $t_1$ provided by the master clock and its correction field is informative of the total sum $\Sigma_1^n RT1i$ of residence time values as measured by the respective transparent clocks. It is noted that, optionally, the correction field can be informative of other derivative of all values of residence time measured by the respective transparent clocks.

The client clock further sends to the master clock DELAY REQUEST message 110 informative of transmission timestamp $t_3$ provided by the client clock. Each transparent clock 103$_i$ receives DELAY REQUEST message, measures and records residence time (RT2$_i$) and forwards DELAY REQUEST message 110 towards the master clock. The master clock timestamps the received DELAY REQUEST message with $t_4$ timestamp and generates DELAY RESPONSE message 112 (referred to hereinafter also as an original version of DELAY RESPONSE message 112) to convey timestamp $t_4$ to the client clock. Each transparent clock 103$_i$ receives respective version of DELAY RESPONSE message, updates the correction field with recorded residence time RT2$_i$ and forwards the updated version 112$_i$ of DELAY RESPONSE message towards the client clock. Thus, client clock receives version 112-n of DELAY RESPONSE message from the last transparent clock $103_n$ in the chain of transparent clocks between the master clock and the client clock. Version $112$-$n$ of DELAY RESPONSE message bears the time stamp $t_4$ provided by the master clock and its correction field is informative of the total sum $\Sigma_1^n$ RT2i (or other predefined derivative) of all values of residence time measured by the respective transparent clocks.

The client clock further uses the timestamps $t_1$-$t_4$ and values in the correction fields for clock correction.

In the illustrated embodiment the transparent clocks measure the residence time when transmitting event PTP messages and further update correction fields of corresponding conveying PTP messages with the respectively measured residence time.

Optionally and alternatively, transparent clocks can update correction fields of the event PTP messages (SYNC and/or DELAY REQUEST).

For example, when the accurate timestamp $t_1$ is embedded in SYNC message 106, transparent clock $103_1$ can receive SYNC message 106, measure residence time $RT1_1$, update a correction field of SYNC message 106 accordingly and forward the updated version 106-1 of SYNC message towards the client clock. Likewise, each next transparent clock $103_{i+1}$ can receive version 106-$i$ of SYNC message, measure residence time $RT1_{i+1}$, update the correction field and forward the updated version 106-($i$+1) of SYNC message towards the client clock. Thus, client clock can receive the last updated version 106-$n$ of SYNC message 106 from the last transparent clock $103n$ in the chain of transparent clocks between the master clock and the client clock. Version 106-$n$ of SYNC message can bear the accurate time stamp $t_1$ provided by the master clock and its correction field can be informative of the total sum $\Sigma_1^n$ RT1i (or other predefined derivative) of residence time values as measured by the respective transparent clocks.

Alternatively or additionally to above correction of SYNC message, when each transparent clock $103_i$ receives respective version of DELAY REQUEST message, it can measure residence time ($RT2_i$), update the correction field accordingly and forward the updated version of DELAY REQUEST message towards the master clock. In such embodiment, the master clock further sends towards the client clock DELAY RESPONSE message bearing the time stamp $t_4$ and having correction field informative of the total sum $\Sigma_1^n$ RT2i (or other appropriate derivative) of residence time as corrected by the respective transparent clocks when transmitting DELAY REQUEST message.

Thus, depending on embodiments, transparent clocks update one of the following combinations of the PTP messages traversing therethrough: SYNC and DELAY REQUEST, SYNC and DELAY RESPONSE, FOLLOW UP and DELAY REQUEST or FOLLOW UP and DELAY RESPONSE.

Unless specifically stated otherwise, throughout the specification the term "a sequence of PTP messages" is referred to a sequence of SYNC, FOLLOW UP (if any), DELAY RESPONSE and DELAY REQUEST messages (including versions thereof (if any)). In some embodiments the clock correction can be provided for each sequence of PTP messages. In other embodiments, the clock correction can be provided using several sequences of the PTP messages. Unless specifically stated otherwise, throughout the specification the term "a cycle of PTP message exchange" is referred to one or more sequences of PTP messages used for a single clock correction.

For purpose of illustration only, the following description is provided for a cycle constituted by a single sequence of SYNC, FOLLOW UP, DELAY RESPONSE and DELAY REQUEST messages (including versions thereof). Those skilled in the art will readily appreciate that the teachings of the presently disclosed subject matter are, likewise, applicable to the cycles constituted by multiple sequences of these messages.

Figure 2:
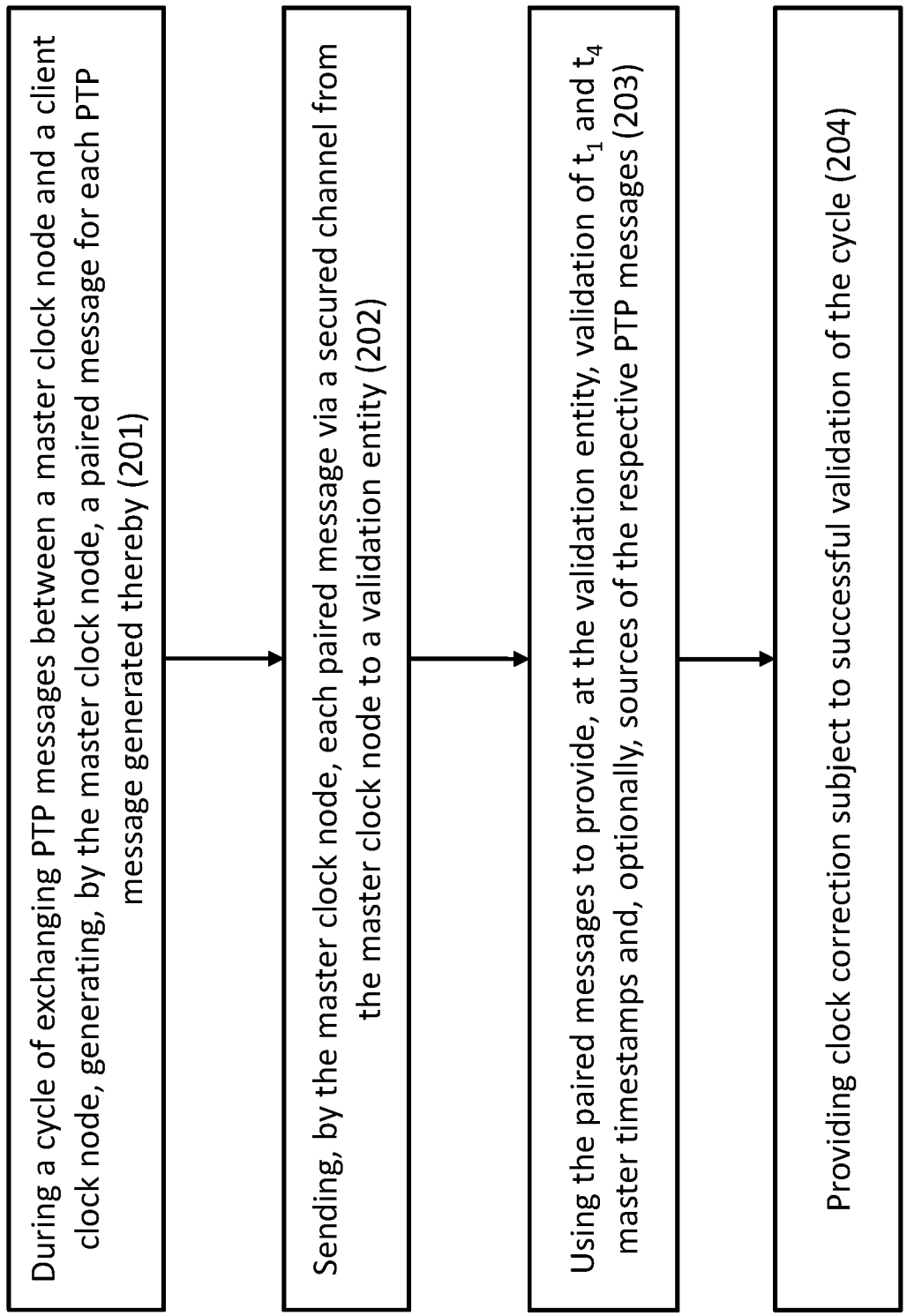
FIG. 2 illustrates a generalized flow chart of securing the clock synchronization procedure in accordance with certain embodiments of the presently disclosed subject matter.

Referring to FIG. 2, there is illustrated a generalized flow chart of securing the known in the art clock synchronization procedure. In accordance with certain embodiments of the presently disclosed subject matter, during a cycle of exchanging PTP messages between a master clock and a client clock, the master clock node generates (201) a paired message for each PTP message generated thereby. A generated paired message is informative of a timestamp embedded in a respective PTP message. A paired message comprises the same message ID as the given PTP message and can be a copy of a given PTP message or can be derived therefrom.

Master clock node further sends (202) each generated paired message to a validation entity via a secured communication channel between the master clock node and the client clock node.

The paired messages can be transmitted substantially concurrently to transmitting the respective PTP messages. Alternatively, for example in some embodiments where the cycle is constituted by multiple sequences of PTP messages, the master clock can transmit together all paired messages generated during the cycle.

For purpose of illustration only, the following description is provided for pre-provisioned AEAD (Authenticated Encryption with Associated Data) secured channels. Those skilled in the art will readily appreciate that the teachings of the presently disclosed subject matter are, likewise, applicable to dynamically provisioned AEAD channel and for other secured peer-to-peer channels configured to deliver the paired messages in encrypted or in plaintext forms whilst enabling authorization of the peers and integrity of data sent across the way.

Validation entity uses the paired messages to validate (203) $t_1$ and $t_4$ timestamps and, optionally, the sources of the respective PTP messages received by the client clock during the cycle. Validation entity can be implemented at the client clock node or as a centralized entity (e.g. one or more servers) operatively connected to the client clock node and the master clock node. The validation process is further detailed with reference to FIGS. 6a and 6b.

Client clock provides (204) clock correction only subject to successful validation of $t_1$ and $t_4$ timestamps and the sources of the respective PTP messages received during the cycle.

Operations 201-204 are further repeated in the next cycles of PTP message exchange.

Figure 3:
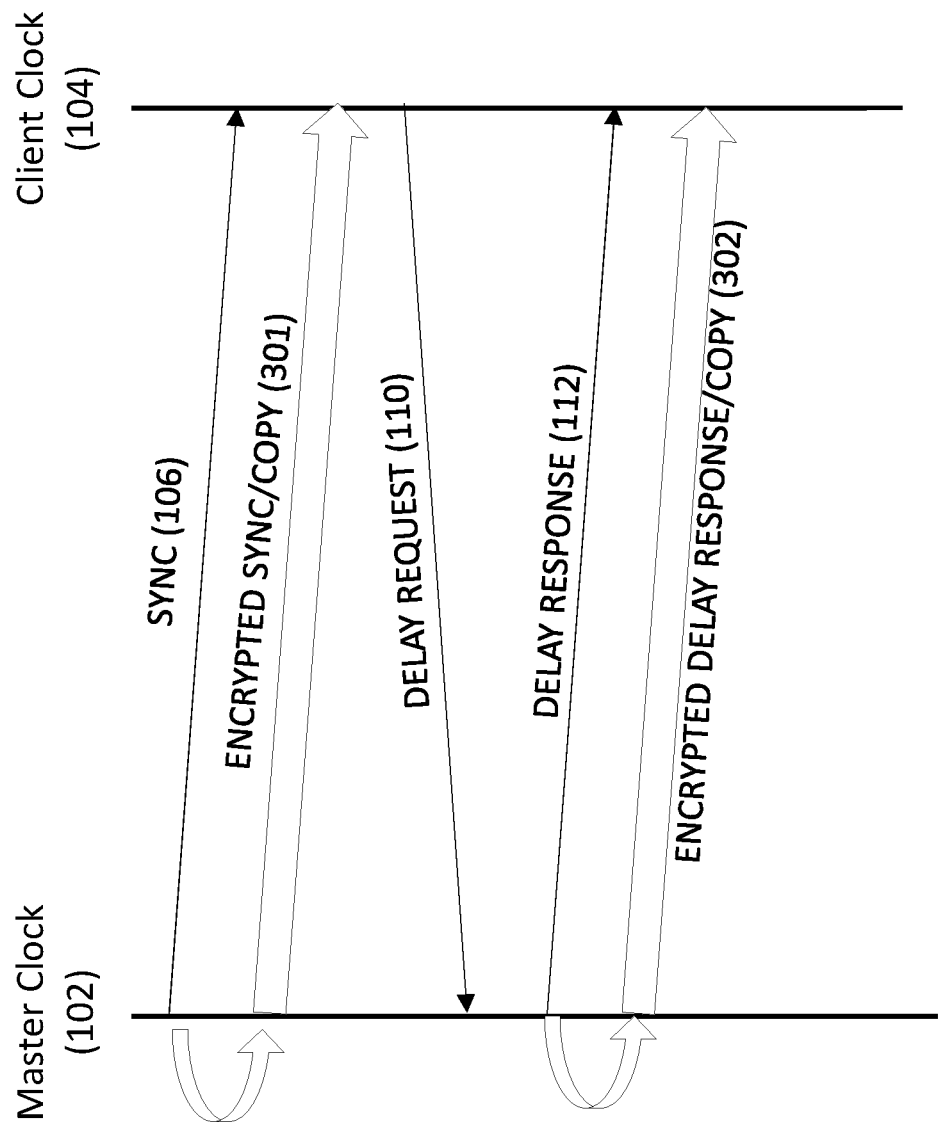
FIG. 3 illustrates a generalized pictogram of non-limiting example of securing the clock synchronization procedure in accordance with certain embodiments of the presently disclosed subject matter.

FIG. 3 illustrates a generalized pictogram of a non-limiting example of the process detailed in FIG. 2. In the illustrated example, as was detailed with reference to FIG. 1b, the master clock transmits during the cycle a SYNC message 106 with embedded accurate timestamp $t_1$ and a DELAY RESPONSE message 112 conveying timestamp $t_4$. In accordance with certain embodiments of the presently disclosed subject matter, upon generating SYNC message 106, master clock 102 generates a message paired to SYNC message 106, and upon generating DELAY RESPONSE message 112, master clock generates a message paired therewith. In the illustrated example, the paired messages are copies of the respective PTP messages, the validation entity is configured at the client clock and the secured channel is a preconfigured AEAD channel. Accordingly, master clock 102 sends, via the AEAD secured channel, the encrypted copies 301 and 302 of respective PTP messages 106 and 112 to the client clock. The validation entity at the client clock checks, for each PTP message received by the client clock, if a master timestamp therein matches a respective master timestamp in its paired message. In a case of successful matching all master timestamps received during the cycle, the validation of the cycle is considered as successful.

In certain embodiments the validation entity can also check a match between the source of the received SYNC message and its paired message received via AEAD channel (and thus having an authorized source), thereby validating that $t_2$ timestamp has been provided by the client clock in response to SYNC message received from an authorized source.

Client clock 104 applies clock correction algorithm only upon successful validation of the master timestamps received during the cycle.

It is noted that likewise to the above, when the accurate $t_1$ timestamp is conveyed by FOLLOW UP message 108, the paired message is generated also for the FOLLOW UP message. Accurate timestamp $t_1$ is validated by matching data in FOLLOW UP message and its paired message. Optionally, master clock can generate and sent to the validation entity also message paired of SYNC message 106, thereby securely indicating the start of the synchronization sequence and enabling validation of $t_2$ timestamp provided by the client node at reception of SYNC message 106.

Figure 4:
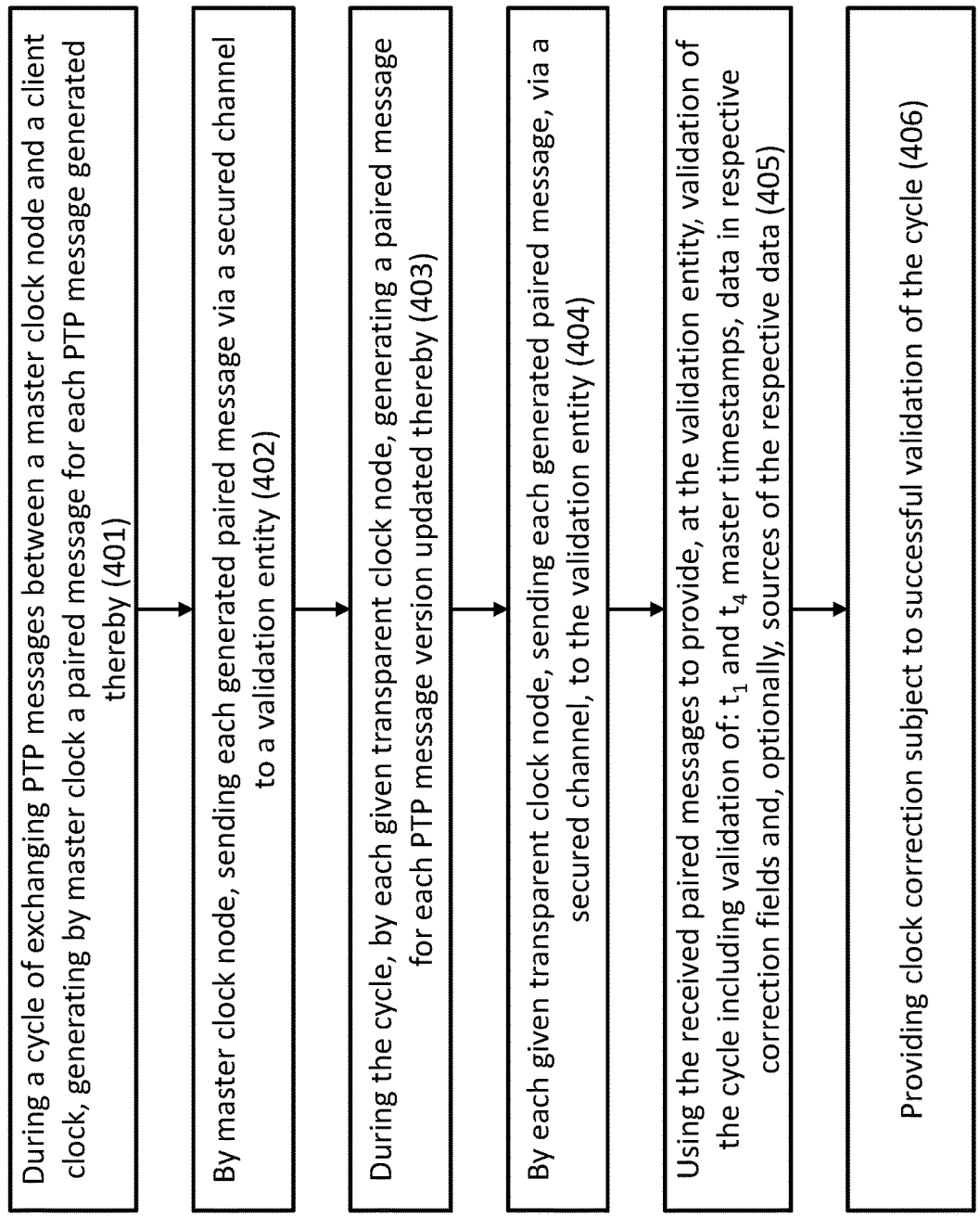
FIG. 4 illustrates a generalized flow chart of securing the clock synchronization procedure in accordance with certain embodiments of the presently disclosed subject matter, wherein the procedure involves traversing via transparent clock nodes.

Referring to FIG. 4, there is illustrated a generalized flow chart of securing known in the art clock synchronization process between a master clock and a client clock via one or more transparent clocks. In accordance with certain embodiments of the presently disclosed subject matter, during a cycle of PTP message exchange, master clock generates (401) a paired message for PTP messages generated thereby (i.e. of SYNC/FOLLOW UP and DELAY RESPONSE messages). The master clock further sends (402) each generated paired message to a validation entity via a AEAD secured communication channel therebetween.

During the cycle of PTP message exchange, each given transparent clock on the located route from the master clock to the client clock generates (403) a paired message for each PTP message version updated thereby. Each given transparent clock further sends (404) each paired message that it has generated to the validation entity via an AEAD secured channel therebetween.

The paired messages can be transmitted substantially concurrently to transmitting the respective versions of PTP messages. Alternatively, for example in some embodiments where the cycle is constituted by multiple sequences of PTP messages, at least one among the master clock and the transparent clocks can store the paired messages respectively generated during the cycle and transmit them all together to the validation entity for the cycle validation.

Likewise in the process of FIG. 2, a paired message can be a copy of a given version of PTP message or can be derived therefrom. Each paired message has the same message ID as the corresponding PTP message.

Thus, for each master timestamp delivered from the master clock to the client clock, the validation entity receives a set of paired messages associated therewith. The paired messages in the set have the same message ID, wherein each given paired message is received via AEAD channel dedicated to a source of the given message. The set of paired messages comprises the paired messages from the master clock and from each of the transparent clock (if any) that updates correction field of respective version of PTP message on its route to the client clock.

In the embodiments when the validation entity is implemented out of the client clock node, the validation entity further receives, via AEAD secured channel with the client clock node, data informative of master timestamps and values in respective correction fields received by the client clock during the cycle of PTP message exchange. Such data can be received from the client clock as copies of the received PTP messages or as derivatives therefrom.

The validation entity uses the received sets of paired messages to validate (405) the cycle. Validating the cycle includes validation of all $t_1$ and $t_4$ master timestamps and of data in respective correction fields received by the client clock during the cycle. Validating the cycle can also comprise validating the sources of respective PTP messages received by the client clock.

Client clock provides clock correction (406) subject to successful validation of the cycle.

Operations 401-406 are further repeated in the next cycle of PTP message exchange.

Thus, among advantages of certain embodiments of the presently disclosed subject matter is protection against a packet content manipulation attack when a man-in-the-middle attacker manipulates suitable fields of time protocol packets in transit, hereby manipulating the clock synchronization of all clocks downstream, or making them go into free-running mode.

Figure 5:
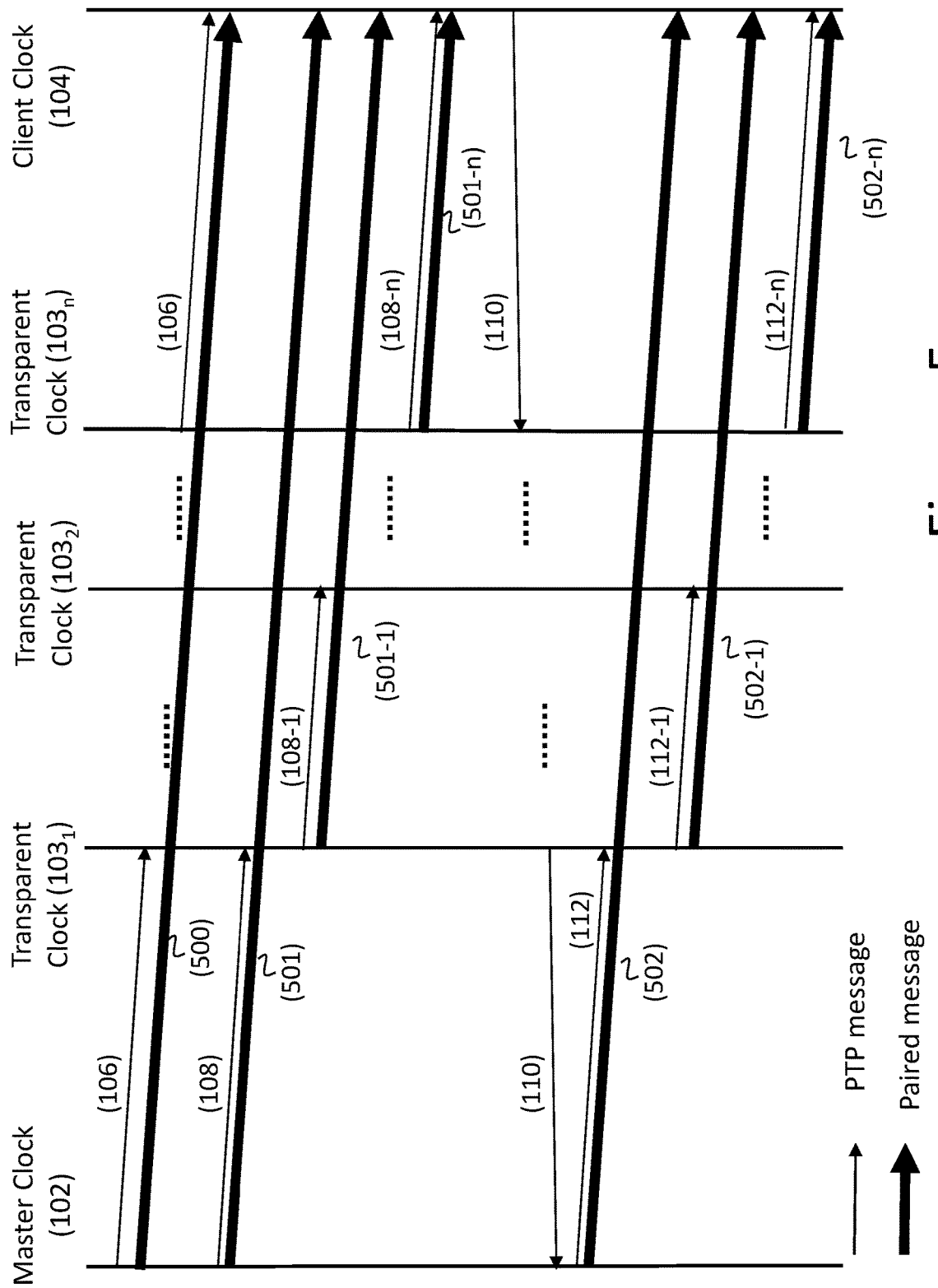
FIG. 5 illustrates a generalized pictogram of non-limiting example of securing the clock synchronization procedure in accordance with certain embodiments of the presently disclosed subject matter, wherein the procedure involves traversing via transparent clock nodes.

FIG. 5 illustrates a generalized pictogram of a non-limiting example of implementing the process detailed in FIG. 4 for securing the PTP message exchange illustrated in FIG. 1c. In the illustrated example the master clock conveys accurate timestamp $t_1$ in FOLLOW UP message 108 (including versions thereof) and the transparent clocks insert the residence time corrections into DELAY RESPONSE message 112 (including versions thereof).

In accordance with certain embodiments of the presently disclosed subject matter, upon generating SYNC message 106, the master clock generates a paired message 500 and sends it to a validation entity via an AEAD channel therebetween. The validation entity in the illustrated example is implemented as a part of the client clock node. Upon generating an original version of FOLLOW UP message 108, master clock 102 generates a message 501 paired thereto and sends the encrypted paired message to the validation entity via the AEAD channel therebetween. Each transparent clock $103_{i+1}$ receives version 108-$i$ of FOLLOW UP message and updates the correction field with residence time measured when traversing SYNC message. Each transparent clock $103_{i+1}$ further generates a respective paired message 501-($i$+1) and sends the encrypted paired message to the validation entity via AEAD secured channel therebetween.

Further, upon generating an original version of DELAY RESPONSE message 112, master clock 102 generates a message 503 paired thereto and sends the encrypted generated paired message to the validation entity. Each transparent clock $103_{i+1}$ receives version 112-$i$ of DELAY RESPONSE message and, upon updating the correction field with residence time measured when traversing DELAY REQUEST message, generates a respective paired message 502-($i$+1) and sends the paired message to the validation entity via AEAD secured channel.

Thus, the client clock node receives from the last transparent clock version 108-$n$ of FOLLOW UP message and version 112-$n$ of DELAY RESPONSE message, thereby obtaining accurate $t_1$ and $t_4$ timestamps and data informative of all residence time corrections provided by the transparent clocks on the route. Further, the client clock node receives from the master clock encrypted message 501 paired to the original version of FOLLOW UP message 108 and encrypted message 502 paired to the original version of DELAY RESPONSE message 112, and receives from respective transparent clocks encrypted paired messages 501-1-501-*n* and 502-1-502-*n*.

Upon decryption, the validation entity uses the received paired messages to validate the cycle.

It is noted that in a case when the transparent clocks update respective versions of DELAY REQUEST messages, each transparent clock generates a message paired to the version of DELAY REQUEST that has been updated thereby, and sends the respective paired message to the validation entity via AEAD channel therebetween. In this case the set of paired messages includes: received from the master clock encrypted message 500 paired to SYNC message, encrypted message 501 paired to the original version of FOLLOW UP message 108 and encrypted message 502 paired to the original version of DELAY RESPONSE message 112, and received from respective transparent clocks encrypted paired messages 501-1-501-*n* and messages paired to respective versions of DELAY REQUEST message.

Figure 6A:
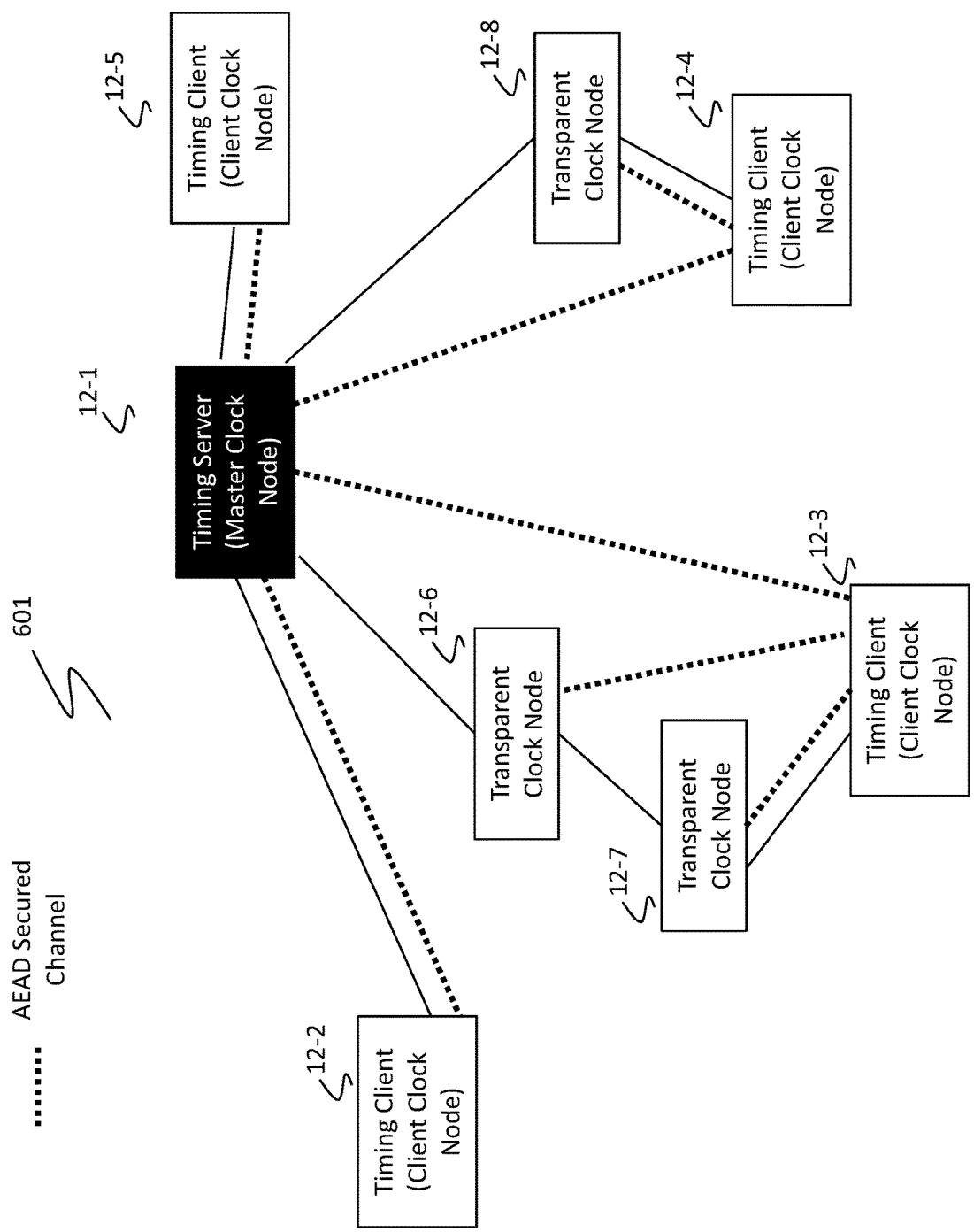
FIGS. 6a and 6b illustrate generalized schematic architecture of secured PTP time distribution networks in accordance with certain embodiments of the presently disclosed subject matter.
Figure 6B:
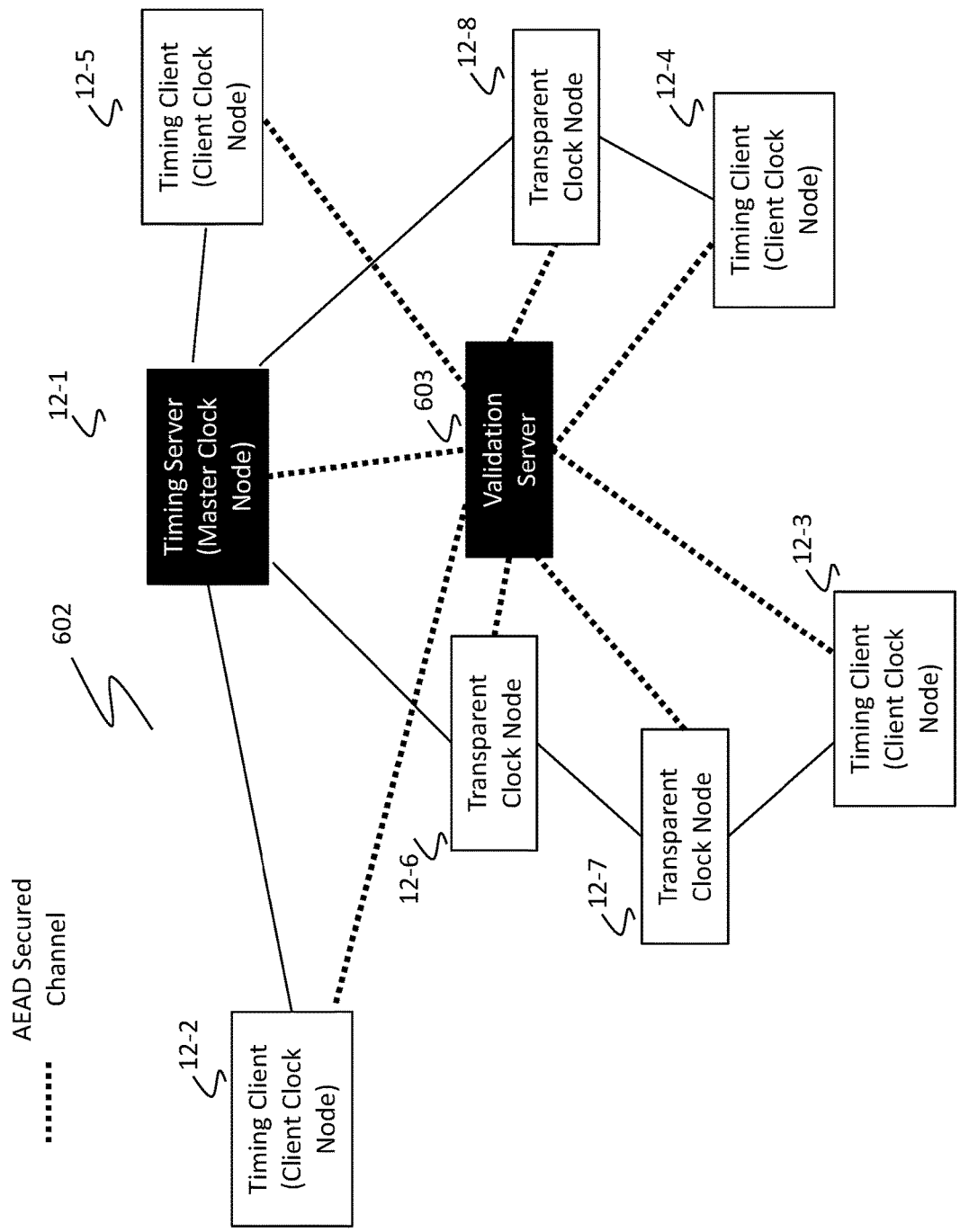

Referring to FIGS. 6a and 6b, there are illustrated non-limiting examples of generalized schematic architecture of secured PTP time distribution network in accordance with certain embodiments of the presently disclosed subject matter.

Time distribution network 601 illustrated in FIG. 6a comprises master clock node 12-1, client clock nodes 12-2-12-5 and transparent clock nodes 12-6-12-8 implementing the Precision Time Protocol (PTP) as detailed with reference to FIGS. 1a-1c. Time distribution network 601 is configured so that a given client clock node further serves as a validation entity for a cycle of PTP message exchange between the master clock node and the given client node. Accordingly, the underlying packet-compatible network is provisioned so to enable an AEAD secured communication channel for each pair constituted by the master clock node and a client clock node. The underlying packet-compatible network is further provisioned so to enable an AEAD secured communication channel for each pair constituted by a given client clock node and a transparent clock node located on the route of PTP message exchange between the given client clock node with the master clock node. The AEAD secured channels are illustrated by the dot lines and can be implemented with the help of any suitable technology (e.g. can be configured as dedicated VLANs encrypted by MACSec, IPSec, etc.). AEAD secured channels enable delivering the paired messages between the peers in the encrypted form whilst assuring the confidentiality and integrity of the transmitted data.

A given client node receives $t_1$ and $t_4$ timestamps and the respective values in correction fields as a part of a standard message exchange in PTP protocol. In parallel, validation entity at the given client node receives the paired messages via the AEAD secured channel(s) and uses the received paired messages to validate the timestamps $t_1$ and $t_4$ and the correction fields. The validation entity further uses the received SYNC paired message to validate the source of SYNC PTP message and, thereby validate timestamp $t_2$ provided by the client in response to reception. Optionally, validation entity can use the paired messages (with sources authorized due to AEAD channel) received from the transparent clocks and network topology data to authorize the respective sources of updated versions of PTP messages.

Time distribution network 602 illustrated in FIG. 6b also comprises master clock node 12-1, client clock nodes 12-2-12-5 and transparent clock nodes 12-6-12-8 implementing the Precision Time Protocol (PTP) as detailed with reference to FIGS. 1a-1c. Time distribution network 602 is configured so that the validation entity is implemented at a centralized validation server 603. Accordingly, the underlying packet-compatible network is provisioned so to enable AEAD secured communication channels between the validation entity and each of the clock nodes 12-1-12-8. The secured channels are illustrated by the dot lines and can be implemented with the help of any suitable technology (e.g. can be configured as dedicated VLANs encrypted by MACSec, IPSec, etc.). Client clock nodes 12-2-12-5 can receive the validation results from validation server 603 in pull and/or push mode.

For validation of a given cycle, the validation entity receives the respective versions of PTP messages from a client clock node via AEAD secured channel therebetween. In parallel, the validation entity receives, from the master clock and the transparent clocks, the encrypted paired messages via the AEAD secured channels and validates the respective master time stamps, data in the correction fields and, optionally, the respective sources.

As stated above, a paired message can be generated as a copy or as a derivative of a respective version of a PTP message. Optionally, some of the paired messages can be generated as copies, and other paired messages can be generated as derivatives. By way of non-limiting example, the master clock can generate the paired messages as copies of respective PTP messages and transparent clocks can generate the paired messages as derivatives of respectively updated versions.

A paired message, when generated by the master clock as a derivative of original version of SYNC, FOLLOW UP or DELAY RESPONSE message, comprises, at least, data informative of ID of respective PTP message and of embedded master timestamp.

A paired message, when generated by a given transparent clock as a derivative of a respective version of SYNC, FOLLOW UP or DELAY RESPONSE message, comprises, at least, data informative of ID of respective PTP message and of value of residence time used for updating the correction field by the given transparent clock.

For purpose of illustration only, the following description is provided for embodiments illustrated in FIG. 5. In the following non-limiting example:

a value in a correction field of a version updated by a given transparent clock is equal to a sum of residential time measured by the given clock and by the respective previous transparent clocks;

the paired messages from the transparent clocks are generated as derivatives from the respective versions of PTP messages and comprise the residence time values of the respective clocks.

Those skilled in the art will readily appreciate that the teachings of the presently disclosed subject matter are, likewise, applicable to the paired messages being copies of the respective versions of PTP messages or being derived therefrom in another way. Likewise, the teachings are applicable for other ways of deriving the value in the correction field from the residence time measured by the transparent clocks.

When validating a cycle, the validation entity obtains a $1^{st}$ set of messages paired with versions of PTP messages informative of $t_1$ timestamp and a $2^{nd}$ set of messages paired with versions of PTP messages informative of $t_4$ timestamp, and uses the obtained sets to provide the following operations:

comparing accurate $t_1$ timestamp in the version of SYNC or FOLLOW UP PTP message received by the client clock and accurate $t_1$ timestamp in the paired message received from the master clock;

comparing the value in the correction field in the version of SYNC or FOLLOW UP message (the one bearing accurate $t_1$ timestamp) received by the client clock with the sum of residence time values in all paired messages received from transparent clocks and comprised in the $1^{st}$ set;

comparing $t_4$ timestamps in the received version of DELAY RESPONSE message and in the paired message received from the master clock and comprised in the $2^{nd}$ set;

comparing the value in the correction field of the received version of DELAY RESPONSE message with the sum of residence time values in all paired messages received from transparent clocks and comprised in the $2^{nd}$ set.

The validation of the cycle is considered as successful when all above compared values are equal. It is noted that for the cycles with multiple sequences of PTP messages, the above operations are provided for each sequence and the cycle is considered as validated when values of all timestamps and correction fields are validated.

Optionally, as detailed above, validation of the cycle can further comprise validation of $t_2$ timestamp and/or authorization of the sources of updated versions of PTP messages.

Figure 7:
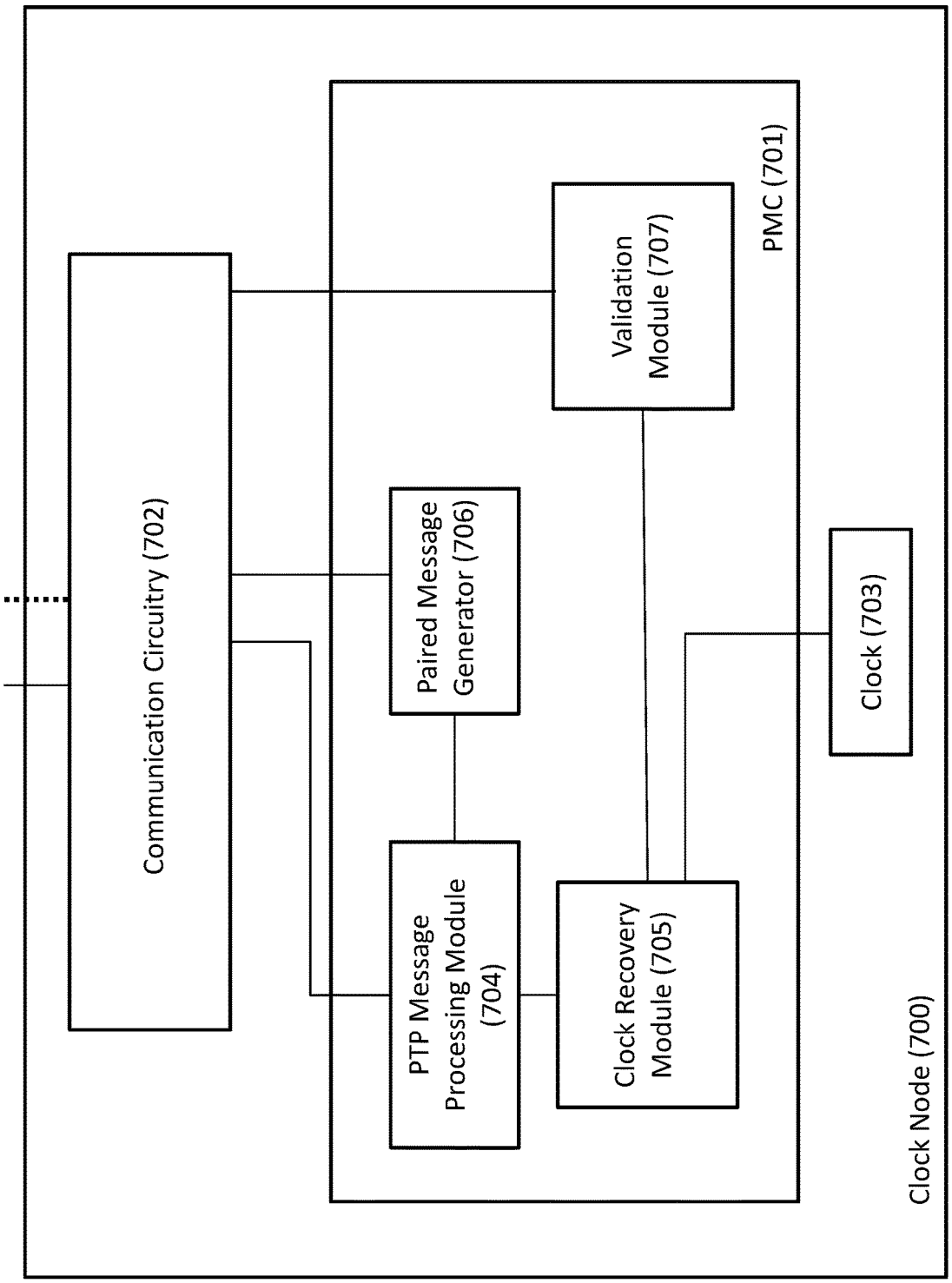
FIG. 7 illustrates a generalized block diagram of a clock node in accordance with certain embodiments of the presently disclosed subject matter.

Referring to FIG. 7, there is illustrated a generalized block diagram of a clock node 700 configurable to operate as a master clock node, a transparent clock node or a client clock node in accordance with certain embodiments of the presently disclosed subject matter.

For purpose of illustration only, the following description is provided for the embodiment when the validation entity is implemented in a clock node when configured as a client clock. Those skilled in the art will readily appreciate that the teachings of the presently disclosed subject matter are, likewise, applicable to the validation entity implemented out of the client clock node (e.g. as illustrated with reference to FIG. 6b).

Clock node 700 comprises a processing and memory circuitry (PMC) 701 operatively connected to a communication circuitry 702 and to a clock 703.

Communication circuitry 702 is configured to enable the clock node to exchange time-informative data packets with another clock node. Communication circuitry 702 is further configured to extract and time-stamp packets with PTP messages for the node's egress direction and encapsulate and precisely timestamp the respective PTP messages for the node's ingress direction.

Communication circuitry 702 comprises secured channel processing circuitry (not shown separately) configured to enable processing (e.g. encryption/decryption, authentication and integrity checks, etc.) necessary for exchanging the paired messages via the secured channels.

PMC 701 is configured to execute several functional modules in accordance with computer-readable instructions implemented therein on a non-transitory computer-readable storage medium. Such functional modules are referred to hereinafter as comprised in the PMC. The functional modules can be implemented in any appropriate combination of software with firmware and/or hardware.

PMC 703 comprises a PTP messages processing functional module 704 operatively connected to a clock recovery functional module 705.

When clock node 700 operates as a master clock or a client clock, PTP messages processing module 704 is configured to generate PTP messages, to insert therein the precise timestamping received from the communication circuitry and to send PTP messages to the communication circuitry 702 for encapsulating and transmitting. PTP messages processing module 704 is also configured to send timestamps "as sent" and "as received" to clock recovery module 705.

When clock node 700 operates as a transparent clock node, PTP messages processing module 704 is configured to use the timestamps "as sent" and "as received" to calculate the residence time of a PTP message and update the correction field accordingly.

PTP clock recovery module 705 is configured to receive "as sent" and "as received" timestamps and the residence time and store them therein.

When the clock node operates as a client clock node, PTP clock recovery module 705 is further configured to run a clock recovery algorithm for each cycle of PTP message exchange. In accordance with certain embodiments of the presently disclosed subject matter, PTP clock recovery module 705 is configured to run the clock recovery algorithm only upon a successful validation of the cycle.

PMC 703 further comprises a paired message generator 706 configured to be operative when clock node 700 operates as a master clock node or a transparent clock node. Paired message generator 706 is configured to generate the paired messages as detailed with reference to FIGS. 2-5 and to send them to communication circuitry 702. Communication circuitry 702 is configured to encrypt the paired messages and to send them via respective secured channels.

PMC 703 further comprises a validation entity 707 configured as a functional module to be operative when clock node 700 operates as a client clock node. The validation module provides cycle validation as detailed with reference to FIGS. 2-6 and informs, in push and/or pull mode, clock recovery module 705 about success or failure of the validation.

It is noted that the teachings of the presently disclosed subject matter are not bound by the clock node described with reference to FIG. 7. Equivalent and/or modified functionality can be consolidated or divided in another manner and can be implemented in any appropriate combination of software with firmware and/or hardware and executed on a suitable device.

It is to be understood that the invention is not limited in its application to the details set forth in the description contained herein or illustrated in the drawings. The invention is capable of other embodiments and of being practiced and carried out in various ways. Hence, it is to be understood that the phraseology and terminology employed herein are for the purpose of description and should not be regarded as limiting. As such, those skilled in the art will appreciate that the conception upon which this disclosure is based may readily be utilized as a basis for designing other structures, methods, and systems for carrying out the several purposes of the presently disclosed subject matter.

It will also be understood that the system according to the invention may be, at least partly, implemented on a suitably programmed computer. Likewise, the invention contemplates a computer program being readable by a computer for executing the method of the invention. The invention further contemplates a non-transitory computer-readable memory tangibly embodying a program of instructions executable by the computer for executing the method of the invention.

Those skilled in the art will readily appreciate that various modifications and changes can be applied to the embodiments of the invention as hereinbefore described without departing from its scope, defined in and by the appended claims.

The invention claimed is:

1. A method of securing a clock synchronization between a master clock node and a client clock node in a packet-compatible network, the method comprising:
    during a cycle of exchanging one or more sequences of Precision Time Protocol (PTP) messages between the master clock node and the client clock node, generating, by the master clock node, a paired message for each PTP message generated thereby and informative of accurate $t_1$ timestamp or of $t_4$ timestamp provided by the master clock node;
    sending, by the master clock node, each paired message to a validation entity, wherein the paired messages are sent via a secured channel between the master clock node and the validation entity;
    using, by the validation entity, the paired messages to provide a validation of the cycle; and
    providing a synchronization-related task subject to successful validation of the cycle by the validation entity.

2. The method of claim 1, wherein the synchronization-related task is a clock correction provided by the client clock node.

3. The method of claim 1, wherein the PTP messages are traversing one or more transparent clock nodes between the master clock node and the client clock node, each transparent clock node updating, with its residence time, correction fields in versions of at least part of PTP messages traversing therethrough, the method further comprising:
    during the cycle, generating by each of the one or more transparent clock nodes a paired message for each version of PTP message updated thereby and sending each generated paired message to the validation entity, wherein
    the paired messages are sent via a secured channel between a respective transparent clock node and the validation entity; and
    using, by the validation entity, the paired messages received from the one or more transparent clocks when validating the cycle.

4. The method of claim 3, wherein each of the one or more transparent clock nodes updates received versions of PTP messages from one of the following combinations of PTP messages: SYNC and DELAY REQUEST PTP messages, SYNC and DELAY RESPONSE PTP messages, FOLLOW UP and DELAY REQUEST PTP messages and FOLLOW UP and DELAY RESPONSE PTP messages.

5. The method of claim 3, wherein the validation entity is implemented as a part of the client clock node and operatively connected by respective secured channels with the master clock node and each of the one or more transparent clock nodes or the validation entity is implemented as a centralized entity operatively connected with the master clock node, the client clock node and each of the one or more transparent clock nodes by respective secured channels.

6. The method of claim 3, wherein each of the secured channels is Authenticated Encryption with Associated Data (AEAD) secured channel.

7. The method of claim 3, wherein the paired messages are copies of respective versions of PTP messages or are derivatives thereof.

8. The method of claim 3, wherein the master clock node generates the paired messages as copies of respective versions of PTP messages and the one or more transparent clock nodes generate the paired messages as derivatives of respectively updated versions, the derivatives informative of residence time of the respective transparent clock nodes.

9. The method of claim 3, wherein the cycle is constituted by multiple sequences of PTP messages and wherein at least one among the master clock node and the one or more transparent clock nodes stores the paired messages generated during the cycle and transmit them all together to the validation entity for the cycle validation.

10. The method of claim 3, wherein the validation of the cycle comprises validating all accurate $t_1$ timestamps, all $t_4$ timestamps and data in all respective correction fields in PTP messages received by the client clock during the cycle.

11. The method of claim 10, wherein the validation of the cycle further comprises at least one of: 1) authorizing sources of SYNC PTP messages and, thereby validating $t_2$ timestamps provided by the client clock node in response to reception of the SYNC PTP messages, 2) authorizing the transparent clock nodes as sources of updated versions of PTP messages.

12. The method of claim 3, wherein each paired message from the one or more transparent clock nodes is generated as a derivative from a respective updated version of PTP message and is informative of a residence time value used for a respective update.

13. The method of claim 12, wherein the validation of the cycle comprises, for each sequence of PTP messages in the cycle:
    comparing an accurate $t_1$ timestamp in a paired message received by the validation entity from the master clock node with an accurate $t_1$ timestamp in a version of PTP message received by the client clock node;
    comparing a value in a correction field in the version of PTP message bearing the accurate $t_1$ timestamp and received by the client clock node with a sum of residence time values from all paired messages informative of the accurate $t_1$ timestamp and received by the validation entity from the one or more transparent clock nodes;
    comparing a $t_4$ timestamp in a paired message received by the validation entity from the master clock node with a $t_4$ timestamp in a version of PTP message received by the client clock node;
    comparing a value in a correction field of the version of DELAY RESPONSE message received by the client clock node with a sum of residence time values from all paired messages informative of $t_4$ or $t_3$ timestamps and received by the validation entity from the one or more transparent clock nodes; and
    considering the validation of the cycle as successful when, for each sequence of PTP messages in the cycle, all compared values are equal.

14. A master clock node configured to operate in a packet-compatible network comprising a client clock node operatively connected to the master clock node, wherein the master clock node is further configured to:
    during a cycle of exchanging one or more sequences of Precision Time Protocol (PTP) messages between the master clock node and the client clock node, generate a paired message for each PTP message generated thereby and informative of accurate $t_1$ timestamp or of $t_4$ timestamp provided by the master clock node;

send each paired message to a validation entity, wherein the paired messages are sent via a secured channel between the master clock node and the validation entity; and upon successful validation of the cycle by the validation entity, provide a synchronization-related task, wherein the validation is provided with the help of the paired messages.

15. The master clock node of claim 14 configured to traverse the one or more sequences of PTP messages via one or more transparent clock nodes between the master clock node and the client clock node, each transparent clock node configured to update, with its residence time, correction fields in versions of at least part of PTP messages traversing therethrough.

16. The master clock node of claim 15 configured to be operatively connected to the validation entity implemented as a part of the client clock node and operatively connected by respective secured channels with each of the one or more transparent clock nodes between the master clock node and the client clock node.

17. The master clock node of claim 15 configured to be operatively connected to the validation entity implemented as a centralized entity operatively connected with the client clock node and each of the one or more transparent clock nodes by respective secured channels.

18. A non-transitory computer-readable medium comprising instructions that, when executed by a master clock node comprising a memory storing a plurality of program components executable by the master clock node operable in a packet-compatible network comprising a client clock node operatively connected to the master clock node, cause the master clock node to:

during a cycle of exchanging one or more sequences of Precision Time Protocol (PTP) messages between the master clock node and the client clock node, generate a paired message for each PTP message generated thereby and informative of accurate $t_1$ timestamp or of $t_4$ timestamp provided by the master clock node;

send each paired message to a validation entity, wherein the paired messages are sent via a secured channel between the master clock node and the validation entity; and upon successful validation of the cycle by the validation entity, provide a synchronization-related task, wherein the validation is provided with the help of the paired messages.

19. The non-transitory computer-readable medium of claim 18, wherein the one or more sequences of PTP messages traverse one or more transparent clock nodes between the master clock node and the client clock node, each transparent clock node configured to update, with its residence time, correction fields in versions of at least part of PTP messages traversing therethrough.

* * * * *